US010601470B2

(12) United States Patent
McCormack et al.

(10) Patent No.: US 10,601,470 B2
(45) Date of Patent: Mar. 24, 2020

(54) CONTACTLESS DATA TRANSFER SYSTEMS AND METHODS (71) Applicant: Keyssa, Inc., Campbell, CA (US)

(72) Inventors: Gary D. McCormack, Tigard, OR (US); Roger D. Isaac, San Jose, CA (US)

(73) Assignee: KEYSSA, INC., Mountain View, CA (US)

(*) Notice: Subject to any disclaimer, the term of this patent is extended or adjusted under 35 U.S.C. 154(b) by 0 days.

(21) Appl. No.: 15/966,711

(22) Filed: Apr. 30, 2018

(65) Prior Publication Data

US 2018/0316394 A1 Nov. 1, 2018

Related U.S. Application Data (63) Continuation of application No. 13/848,735, filed on Mar. 22, 2013, now Pat. No. 9,960,820, which is a continuation-in-part of application No. 13/776,727, filed on Feb. 26, 2013, now Pat. No. 9,219,956, and a continuation-in-part of application No. 13/760,089, (Continued)

(51) Int. Cl.
*H04B 7/24* (2006.01)
*H04B 7/00* (2006.01)
*H04W 8/08* (2009.01)

(52) U.S. Cl.
CPC .............. *H04B 7/00* (2013.01); *H04W 8/085* (2013.01)

(58) Field of Classification Search
CPC ........ H04B 7/00; H04W 8/085; H04W 4/008; H04W 52/0229; H04W 76/043; G06F 13/00; G09G 2370/16; G09G 5/006; H01P 3/165; H04L 2463/101; H04L 67/06;
(Continued)

(56) References Cited

U.S. PATENT DOCUMENTS 3,796,831 A 3/1974 Bauer
4,485,312 A 11/1984 Kusakabe et al.
(Continued)

FOREIGN PATENT DOCUMENTS

CN 1618182 A 5/2005
CN 1848021 A 10/2006

OTHER PUBLICATIONS

Akin, "802.11i Authentication and Key Management (AKM), White Paper" May 2005, 10 pages, https://www.cwnp.com/uploads/802-11i_key_management.pdf.
(Continued)

*Primary Examiner* — Xin Jia
(74) *Attorney, Agent, or Firm* — Van Court & Aldridge LLP (57) ABSTRACT Data may be transferred from a communication subsystem of a first device to a communication subsystem of a second device contactlessly, at high speed, and without intervention by host processors of either device. Devices may be programmed or personalized at the factory or warehouse, and may personalized at a warehouse or at a point of sale while in the box. Various modes of operation and use scenarios are described. Portions of the devices themselves, or a transmission path between the devices may be shielded against snooping by a material which degrades an EHF signal passing therethrough.

12 Claims, 4 Drawing Sheets

Related U.S. Application Data filed on Feb. 6, 2013, now Pat. No. 9,191,263, and a continuation-in-part of application No. 13/713,564, filed on Dec. 13, 2012, now Pat. No. 8,794,980, and a continuation-in-part of application No. 13/541,543, filed on Jul. 3, 2012, now abandoned, and a continuation-in-part of application No. 13/524,956, filed on Jun. 15, 2012, now Pat. No. 9,322,904, and a continuation-in-part of application No. 13/427,576, filed on Mar. 22, 2012, now Pat. No. 9,444,146, and a continuation-in-part of application No. 12/655,041, filed on Dec. 21, 2009, now Pat. No. 8,554,136.

(60) Provisional application No. 61/799,510, filed on Mar. 15, 2013, provisional application No. 61/786,522, filed on Mar. 15, 2013, provisional application No. 61/737,432, filed on Dec. 14, 2012, provisional application No. 61/661,756, filed on Jun. 19, 2012, provisional application No. 61/570,707, filed on Dec. 14, 2011, provisional application No. 61/497,192, filed on Jun. 15, 2011, provisional application No. 61/467,334, filed on Mar. 24, 2011, provisional application No. 61/203,702, filed on Dec. 23, 2008.

(58) Field of Classification Search
CPC ... H04L 67/2823; H05K 1/0243; H05K 1/0259; H05K 2201/10098; Y02B 60/50
See application file for complete search history.

(56) References Cited

U.S. PATENT DOCUMENTS

| | | |
|---|---|---|
| 4,497,068 A | 1/1985 | Fischer |
| 4,694,504 A | 9/1987 | Porter et al. |
| 5,543,808 A | 8/1996 | Feigenbaum et al. |
| 5,621,913 A | 4/1997 | Tuttle et al. |
| 5,754,948 A | 5/1998 | Metze |
| 5,773,878 A | 6/1998 | Lim et al. |
| 5,956,626 A | 9/1999 | Kaschke et al. |
| 6,304,157 B1 | 10/2001 | Wada et al. |
| 6,373,447 B1 | 4/2002 | Rostoker et al. |
| 6,490,443 B1 | 12/2002 | Freeny, Jr. |
| 6,492,973 B1 | 12/2002 | Kuroki et al. |
| 6,534,784 B2 | 3/2003 | Eliasson et al. |
| 6,542,720 B1 | 4/2003 | Tandy |
| 6,607,136 B1 | 8/2003 | Atsmon et al. |
| 6,718,163 B2 | 4/2004 | Tandy |
| 6,915,529 B1 | 7/2005 | Suematsu et al. |
| 6,967,347 B2 | 11/2005 | Estes et al. |
| 7,107,019 B2 | 9/2006 | Tandy |
| 7,311,526 B2 | 12/2007 | Rohrbach et al. |
| 7,512,395 B2 | 3/2009 | Beukema et al. |
| 7,517,222 B2 | 4/2009 | Rohrbach et al. |
| 7,593,708 B2 | 9/2009 | Tandy |
| 7,598,923 B2 | 10/2009 | Hardacker et al. |
| 7,612,630 B2 | 11/2009 | Miller |
| 7,617,342 B2 | 11/2009 | Rofougaran |
| 7,645,143 B2 | 1/2010 | Rohrbach et al. |
| 7,656,205 B2 | 2/2010 | Chen et al. |
| 7,665,137 B1 | 2/2010 | Barton et al. |
| 7,760,045 B2 | 7/2010 | Kawasaki |
| 7,761,092 B2 | 7/2010 | Desch et al. |
| 7,768,457 B2 | 8/2010 | Pettus et al. |
| 7,769,347 B2 | 8/2010 | Louberg et al. |
| 7,778,621 B2 | 8/2010 | Tandy |
| 7,791,167 B1 | 9/2010 | Rofougaran |
| 7,881,675 B1 | 2/2011 | Gazdzinski |
| 7,889,022 B2 | 2/2011 | Miller |
| 7,907,924 B2 | 3/2011 | Kawasaki |
| 7,929,474 B2 | 4/2011 | Pettus et al. |
| 7,975,079 B2 | 7/2011 | Bennett et al. |
| 8,014,416 B2 | 9/2011 | Ho et al. |
| 8,036,629 B2 | 10/2011 | Tandy |
| 8,041,227 B2 | 10/2011 | Holcombe et al. |
| 8,087,939 B2 | 1/2012 | Rohrbach et al. |
| 8,121,542 B2 | 2/2012 | Zack et al. |
| 8,183,935 B2 | 5/2012 | Milano et al. |
| 2004/0214621 A1 | 10/2004 | Leon et al. |
| 2005/0109841 A1 | 5/2005 | Ryan et al. |
| 2005/0140436 A1 | 6/2005 | Ichitsubo et al. |
| 2005/0157568 A1 | 7/2005 | Teicher |
| 2006/0038168 A1 | 2/2006 | Estes et al. |
| 2006/0159158 A1 | 7/2006 | Moore et al. |
| 2006/0166740 A1 | 7/2006 | Sufuentes |
| 2006/0258289 A1 | 11/2006 | Dua |
| 2007/0024504 A1 | 2/2007 | Matsunaga |
| 2007/0063056 A1 | 3/2007 | Gaucher et al. |
| 2007/0147425 A1 | 6/2007 | Lamoureux et al. |
| 2007/0229270 A1 | 10/2007 | Rofougaran |
| 2007/0278632 A1 | 12/2007 | Zhao et al. |
| 2008/0010372 A1 | 1/2008 | Khedouri et al. |
| 2008/0055093 A1 | 3/2008 | Shkolnikov et al. |
| 2008/0089667 A1 | 4/2008 | Grady et al. |
| 2008/0112101 A1 | 5/2008 | McElwee et al. |
| 2008/0150799 A1 | 6/2008 | Hemmi et al. |
| 2008/0159243 A1 | 7/2008 | Rofougaran |
| 2008/0165065 A1 | 7/2008 | Hill et al. |
| 2008/0192726 A1 | 8/2008 | Mahesh et al. |
| 2008/0195788 A1 | 8/2008 | Tamir et al. |
| 2008/0211631 A1 | 9/2008 | Sakamoto |
| 2008/0290959 A1 | 11/2008 | Ali et al. |
| 2009/0006677 A1 | 1/2009 | Rofougaran |
| 2009/0009337 A1 | 1/2009 | Rofougaran |
| 2009/0037627 A1 | 2/2009 | Rofougaran |
| 2009/0037628 A1 | 2/2009 | Rofougaran |
| 2009/0094506 A1 | 4/2009 | Lakkis |
| 2009/0098826 A1 | 4/2009 | Zack et al. |
| 2009/0106676 A1* | 4/2009 | Brezina ............... H04M 15/00 715/763 |
| 2009/0175323 A1 | 7/2009 | Chung |
| 2009/0218407 A1 | 9/2009 | Rofougaran |
| 2009/0218701 A1 | 9/2009 | Rofougaran |
| 2009/0236701 A1 | 9/2009 | Sun et al. |
| 2009/0239392 A1 | 9/2009 | Sumitomo et al. |
| 2009/0239483 A1 | 9/2009 | Rofougaran |
| 2009/0245808 A1 | 10/2009 | Rofougaran |
| 2010/0127804 A1 | 5/2010 | Vouloumanos |
| 2010/0159829 A1 | 6/2010 | McCormack |
| 2010/0202499 A1 | 8/2010 | Lee et al. |
| 2010/0203833 A1* | 8/2010 | Dorsey ............... G06Q 10/02 455/41.2 |
| 2010/0231452 A1 | 9/2010 | Babakhani et al. |
| 2010/0283700 A1 | 11/2010 | Rajanish et al. |
| 2010/0285634 A1 | 11/2010 | Rofougaran |
| 2010/0297954 A1 | 11/2010 | Rofougaran et al. |
| 2011/0047588 A1 | 2/2011 | Takeuchi et al. |
| 2011/0181484 A1 | 7/2011 | Pettus et al. |
| 2011/0197237 A1 | 8/2011 | Turner |
| 2011/0207425 A1 | 8/2011 | Juntunen et al. |
| 2011/0285606 A1 | 11/2011 | Graauw et al. |
| 2011/0286703 A1 | 11/2011 | Kishima et al. |
| 2011/0311231 A1 | 12/2011 | Ridgway et al. |
| 2012/0028582 A1 | 2/2012 | Tandy |
| 2012/0064664 A1 | 3/2012 | Yamazaki et al. |
| 2012/0083137 A1 | 4/2012 | Rohrbach et al. |
| 2012/0106683 A1 | 5/2012 | Zhao |
| 2012/0109303 A1 | 5/2012 | Capote |
| 2012/0158590 A1* | 6/2012 | Salonen ............... G06Q 10/02 705/44 |
| 2012/0263244 A1 | 10/2012 | Kyles et al. |
| 2012/0286049 A1 | 11/2012 | McCormack et al. |
| 2012/0290760 A1 | 11/2012 | McCormack et al. |
| 2012/0295539 A1 | 11/2012 | McCormack et al. |
| 2012/0307932 A1 | 12/2012 | McCormack et al. |
| 2012/0319496 A1 | 12/2012 | McCormack et al. |
| 2012/0319890 A1 | 12/2012 | McCormack et al. |
| 2013/0041824 A1* | 2/2013 | Gupta ............... G06Q 20/14 705/44 |
| 2013/0070817 A1 | 3/2013 | McCormack et al. |
| 2013/0138521 A1* | 5/2013 | Want ............... G06Q 20/32 705/26.1 |

(56) References Cited

U.S. PATENT DOCUMENTS

2013/0315235 A1    11/2013   Foo
2014/0213185 A1     7/2014   Arponen et al.
2014/0248801 A1     9/2014   Riezebos et al.

OTHER PUBLICATIONS

International Search Report & Written Opinion, PCT/US13/33394, dated Aug. 8, 2013, 9 pages.

\* cited by examiner

CONTACTLESS DATA TRANSFER SYSTEMS AND METHODS

CROSS-REFERENCE(S) TO RELATED APPLICATIONS

This application is a continuation of U.S. patent application Ser. No. 13/848,735 filed Mar. 22, 2013 (now U.S. Pat. No. 9,960,820), which is a continuation-in-part of U.S. patent application Ser. No. 13/760,089 filed Feb. 6, 2013 (now U.S. Pat. No. 9,191,263). U.S. patent application Ser. No. 13/848,735 is also a continuation-in-part of U.S. patent application Ser. No. 13/776,727 filed Feb. 26, 2013 (now U.S. Pat. No. 9,219,956), of U.S. patent application Ser. No. 13/713,564 filed Dec. 13, 2012 (now U.S. Pat. No. 8,7949,802), of U.S. patent application Ser. No. 13/541,543 filed Jul. 3, 2012 (now abandoned), of U.S. patent application Ser. No. 13/524,956 filed Jun. 15, 2012 (now U.S. Pat. No. 9,322,904), of U.S. patent application Ser. No. 13/427,576 filed Mar. 22, 2012 (now U.S. Pat. No. 9,444,146), and of U.S. patent application Ser. No. 12/655,041 filed Dec. 21, 2009 (now U.S. Pat. No. 8,554,136).

U.S. patent application Ser. No. 13/848,735 claims priority to U.S. Provisional Patent Application No. 61/786,522 filed Mar. 15, 2013, to U.S. Provisional Patent Application No. 61/799,510 filed Mar. 15, 2013, and to U.S. Provisional Patent Application No. 61/737,432 filed Dec. 14, 2012. U.S. patent application Ser. No. 13/760,089 claims priority to U.S. Provisional Application No. 61/661,756 filed Jun. 19, 2012. U.S. patent application Ser. No. 13/713,564 claims priority to U.S. Provisional Patent Application No. 61/570,707 filed Dec. 14, 2011. U.S. patent application Ser. No. 13/524,956 claims priority to U.S. Provisional Patent Application No. 61/497,192 filed Jun. 15, 2011. U.S. patent application Ser. No. 13/427,576 claims priority to U.S. Provisional Patent Application No. 61/467,334 filed Mar. 24, 2011. U.S. patent application Ser. No. 12/655,041 claims priority to U.S. Provisional Patent Application No. 61/203,702 filed Dec. 23, 2008.

The content of the earlier applications is incorporated by reference herein.

TECHNICAL FIELD

This disclosure relates broadly data transfer techniques, particularly connection-oriented techniques, and also relates to systems incorporating said techniques.

BACKGROUND

It is often important to transfer data between electronic devices. The data may comprise a media file (such as an image file, an audio file, a video file), DRM (digital rights management) protected content, an OS (operating system) update, customer specific code, OEM (original equipment manufacturer) specific code, retail specific code, a firmware image for the destination device, user data, encryption/decryption keys (codes), electronic funds transfer (EFT) data, static data and the like. The data may be transferred from a "source" (or sending) device such as a digital camera to a "destination" (or receiving) device such as a laptop. In some cases, data may also be transferred in the reverse direction, with the "destination" device serving as the source of the data, and the "source" device serving as the destination for the data. The transfer of data may occur via a communications link such as a cabled connection (such as USB), or via a wireless connection (such as Bluetooth). In the case of DRM or other access-controlled content, separate authorization (codes) may be required for using the data on the destination device.

Some examples of electronic devices which may be involved in the transfer of data include cellphones (or handsets, or smart phones), computers, laptops, tablets, or comparable electronic device. Such electronic devices typically include a "host processor" (or microprocessor or simply "processor", or microcontroller, or ".mu.C"), and resources (memory or storage) for storing data (any of which may be referred to simply as "storage").

In the main hereinafter, point-to-point connection-oriented techniques for data transfer between two electronic devices will be discussed. Generally, in order for the data transfer (which may be referred to as "uploading" or "downloading") to occur, both devices need to have compatible software installed so that they can have access to one another. During the data transfer, the devices need to be turned ON (operating), consequently system resources are consumed and for battery-operated devices, remaining (available) battery power diminishes.

An illustrative example of a point-to-point, connection-oriented communications link for transferring data between electronic devices is Near Field Communication (NFC). NFC implements a set of standards for smartphones and similar devices to establish radio frequency (RF) communication with each other by touching ("bumping") them together or bringing them into close proximity with one another. Present and anticipated applications include contactless transactions, data exchange, and simplified setup of more complex communications such as Wi-Fi. Communication is also possible between an NFC-enabled device and an unpowered NFC chip, called a "tag", which may harvest its operating power from the NFC-enabled device.

When transferring data between electronic devices, it is generally necessary that the devices' host processor(s) become involved and that data is transferred under its direction and control. When a data connection is made, the host processor is typically notified, then may authenticate the connection, and if there is a data transfer to be made, the host processor allocates memory for the data (or identifies the data that will be transferred) and then directs the action. At the end of the transfer, the host processor then validates the transaction. This process requires that the host processor be aware of and direct the transaction. This method of transferring data between electronic devices may create a number of problems, such as:

- the host processor must be ON (powered up) for the data transfer to take place;
- the host processor must be configured for the data transfer to take place;
- the overall system power consumption is higher than if the host processor were not involved;
- the data may be malicious code and may cause problems if being handled by the host processor
- the transfer time for the data, using NFC or other existing wireless technologies, may be very long

SUMMARY

It is a general object of the invention to provide improved techniques for transferring data between electronic devices.

According to the invention, generally, electronic devices (or simply "devices") may comprise a host system and an I/O (input/output) or communication subsystem. The host system may comprise a host processor and "primary" storage. The I/O subsystem may comprise a controller, "exchange" storage, and an RF (radio frequency) portion comprising at least one of a transmitter (Tx) or receiver (Rx), or at least one transceiver (Tx/Rx). The host processor may function as the communication subsystem controller. The primary and exchange storages may be different portions of one storage.

Data transfers between electronic devices may be implemented over a "contactless" radio frequency (RF) electromagnetic (EM) Extremely High Frequency (EHF) communications link (interface), which is handled substantially entirely by the communication subsystems of the devices involved in the data transfer.

Data to be transferred may be stored (temporarily) in an "exchange" storage of (or associated with) the communication subsystem of a source (sending) device, awaiting detection (by the source device) of a destination (receiving) device. The host system of the sending device may be OFF, or in a low-power mode. Upon detection of a destination device, a communications link may be established and the data may be transferred to an "exchange" storage of the communication subsystem of the destination (receiving) device where it may be stored (temporarily). The host system of the receiving device may be OFF, or in a low-power mode. Data in the exchange storages of the sending and receiving devices may be firewalled, to protect the host system from malicious code in the data being transferred. The communication subsystem of the receiving device may notify the host system of the receiving device (and may also notify the communication subsystem of the sending device) when the data transfer operation is complete. When the receiving device is turned ON, data from its "exchange" storage may be moved (or copied) to its primary storage. Data may be also transferred in a similar manner from the receiving device to the sending device.

According to some embodiments of the invention, a system and methods for data transfer may comprise devices having communication subsystems for establishing a "contactless" radio frequency (RF) electromagnetic (EM) Extremely High Frequency (EHF) communications link (interface), which is handled substantially entirely by the communication subsystems of the devices involved in the data transfer. Various modes of data transfer and use scenarios are described.

According to an embodiment of the invention, a method of transferring data between electronic devices may comprise: providing a first device with a first communication subsystem capable of communicating contactlessly over an extremely high frequency (EHF) contactless link with a second device having a second communication subsystem capable of communicating over the contactless link; and sending data from the first device to the second device; characterized by: receiving the data at the second device into an exchange storage associated with the second communication subsystem, without requiring intervention from a host processor in the second device. The exchange storage may be separate from a primary storage in the second device, and the received data may be transferred from the exchange storage to the primary storage. The host processor may be notified upon completion of the data transfer. The data may be validated by the communication subsystem or at the host processor. The data being transferred may be selected from the group consisting of a media file, DRM protected content, an OS update, customer specific code, OEM specific code, retail specific code, a firmware image for the second device, user data, encryption/decryption keys, and electronic funds transfer (EFT) data.

The second device may be enclosed inside of packaging, and the contactless communication between the first and second devices may occurs through the packaging. A dielectric coupler may facilitate the contactless link between the first and second devices, and may be incorporated into the packaging, or may extend from at least one of the first and second devices.

Various anti-snooping techniques are described for providing "technical" and "physical" protection(s) against snooping of data being transferred, such as pausing transmissions from one device and transmitting skip fills from the other device, transmitting from both devices at the same time, covering at least one of portions (Tx/Rx) of the devices or a transmission path between the devices with a material selected for its ability to degrade an EHF signal passing through the material.

According to an embodiment of the invention, a method of transferring data contactlessly over an extremely high frequency (EHF) contactless link between a first device and a second device may comprise one or more of factory programming the second device, by at least one of transferring data comprising an operating system or firmware to the second device, and performing a quality assurance check on the second device; warehouse programming the second device, by at least one of transferring data comprising an operating system or firmware to the second device, performing a quality assurance check on the second device and personalizing the second device for a point of sale (POS); point of sale programming the second device, by at least one of transferring data comprising an operating system or firmware to the second device, performing a quality assurance check on the second device, personalizing the second device for a point of sale (POS), and personalizing the second device for a given customer; and kiosk transferring data to the second device, wherein data selected by a user or associated with an event is transferred into the second device.

According to an embodiment of the invention, a method of transferring data contactlessly over an extremely high frequency (EHF) contactless link between a first device and a second device may comprise one or more of communicating permissions and preferences between a user and a shared system; and sharing data, including interactively, between two devices. Transferring data may comprise: at the first device, identifying data to be transferred; at the first device, transmitting a beacon to discover the second device; at the second device, detecting and optionally responding to the beacon; setting up and commencing the data transfer; initiating the data transfer automatically or on request; and optionally notifying the first device upon successful transfer of the data. The first device may broadcast the data to be transferred, and a data stream for the data being transferred may be indexed. The second device may commence receiving the data stream at an intermediate point, and the first device may restart transmission of the data stream after it has finished.

According to an embodiment of the invention, a system may be implemented for transferring data between a first device and a second device, through an EHF carrier, through at least one dielectric medium, between communication subsystems that operate independently of host controllers within each device.

According to an embodiment of the invention, a method of protecting against snooping of data being transferred contactlessly between two electronic devices may comprise one or more of: shielding at least a transmission path between the two electronic devices; and shielding at least a transceiver (Tx/Rx) of at least one of the electronic devices. The shielding may comprise covering at least a portion of the transmission path or the transceiver with a material selected for its ability to degrade an extremely high frequency (EHF) signal passing through the material.

Some benefits or advantages of the techniques disclosed herein may include one or more of the following:
- no physical connection (such as a cable and connectors) is needed between the two devices involved in the data transfer
- the host processor need not be ON for the data transfer to take place
- the host processor need not be configured for the data transfer to take place
- the overall power required by the devices may be significantly reduced
- problems associated with the transfer of malicious code may be avoided
- the transfer time for the data may be substantially reduced, in contrast with some previous data transfer techniques The invention(s) described herein may relate to industrial and commercial industries, such as electronics and communications industries using devices that communicate with other devices or devices having communication between components in the devices.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGs). The figures may be in the form of diagrams. Some elements in the figures may be exaggerated or drawn not-to-scale; others may be omitted, for illustrative clarity. Any text (legends, notes, reference numerals and the like) appearing on the drawings are incorporated by reference herein. When terms such as "left" and "right", "top" and "bottom", "upper" and "lower", "inner" and "outer", or similar terms are used in the description, they may be used to guide the reader to orientations of elements in the figures, but should be understood not to limit the apparatus being described to any particular configuration or orientation, unless otherwise specified or evident from context. Different "versions" of elements may be referenced by reference numerals having the same numbers (###) followed by a different letter suffix (such as "A", "B", "C", or the like), in which case the similar elements may be inclusively referred to by the numeric portion (###) only of the reference numeral.

DETAILED DESCRIPTION

Various embodiments may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another.

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity.

Reference herein to "one embodiment", "an embodiment", or similar formulations, may mean that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In the following descriptions, some specific details may be set forth in order to provide an understanding of the invention(s) disclosed herein. It should be apparent to those skilled in the art that these invention(s) may be practiced without these specific details. Headings (typically underlined) may be provided as an aid to the reader, and should not be construed as limiting.

Some Terminology

The following terms may be used in the descriptions set forth herein, and should be given their ordinary meanings unless otherwise explicitly stated or as may be evident from context.

The acronym "EHF" stands for Extremely High Frequency, and refers to a portion of the electromagnetic (EM) spectrum in the range of 30 GHz to 300 GHz (gigahertz).

The term "transceiver" (abbreviated "XCVR", or "Tx/Rx") may refer to a device such as an IC (integrated circuit) including a transmitter ("Tx") and a receiver ("Rx") so that that the integrated circuit may be used to both transmit and receive information (data). Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for the transmit and the receive functions.

The term "contactless", as used herein, refers to implementing electromagnetic (EM) rather than electrical (wired, contact-based) connections and transport of signals between entities (such as devices). In some of the literature, the term "wireless" is used to convey this meaning. As used herein, the term "contactless" may refer to a carrier-assisted, dielectric coupling system which may have an optimal range in the zero to five centimeter range. The connection may be validated by proximity of one device to a second device. Multiple contactless transmitters and receivers may occupy a small volume of space. A contactless link established with electromagnetics (EM) may be point-to-point in contrast with a wireless link which typically broadcasts to several points.

The terms, chip, die, integrated circuit (IC), semiconductor device, and microelectronic device, are often used interchangeably, in common usage, and may be used interchangeably herein. This also may include bare chips (or dies), packaged chips (or dies), and chip modules and packages. The techniques disclosed herein may be implemented with integrated circuits (ICs) using standard CMOS (Complementary-Metal-Oxide-Semiconductor) processes. Some functions described as being implemented by chips may be implemented as macro-functions incorporated into application specific integrated circuits (ASICS) and the like, and may alternatively be implemented, at least partially, by software running on a microcontroller. With respect to chips, various signals may be coupled between them and other circuit elements via physical, electrically-conductive connections. Such a point of connection is may be referred to as an input, output, input/output (I/O), terminal, line, pin, pad, port, interface, or similar variants and combinations.

Connector-Replacement Chips

US 20100159829 (the '829 publication), incorporated in its entirety by reference herein, discloses tightly-coupled near-field communication-link devices, referred to therein as "connector-replacement chips". Tightly-coupled near-field transmitter/receiver pairs are deployed such that the transmitter is disposed at a terminal portion of a first conduction path, the receiver is disposed at a terminal portion of a second conduction path, the transmitter and receiver are disposed in close proximity to each other, and the first conduction path and the second conduction path are discontiguous with respect to each other. In this manner, methods and apparatus are provided for transferring data through a physically discontiguous signal conduction path without the physical size and signal degradation introduced by a signal-carrying mechanical connector, and associated cabling. The '829 publication references U.S. Pat. No. 5,621,913 (Micron, 1997), which is also incorporated in its entirety by reference herein. The '829 publication shows (FIG. 12 therein) a high-level block diagram of the transmit path of a near-field transmitter, and further shows (FIG. 13 therein) a high-level block diagram of the receive path of a near-field receiver.

US 20120263244 (the '244 publication), incorporated in its entirety by reference herein, discloses integrated circuit with electromagnetic communication. A system for transmitting or receiving signals may include an integrated circuit (IC), a transducer operatively coupled to the IC for converting between electrical signals and electromagnetic signals; and insulating material that fixes the locations of the transducer and IC in spaced relationship relative to each other. The system may further include a lead frame providing external connections to conductors on the IC. An electromagnetic-energy directing assembly may be mounted relative to the transducer for directing electromagnetic energy in a region including the transducer and in a direction away from the IC. The directing assembly may include the lead frame, a printed circuit board ground plane, or external conductive elements spaced from the transducer. In a receiver, a signal-detector circuit may be responsive to a monitor signal representative of a received first radio-frequency electrical signal for generating a control signal that enables or disables an output from the receiver.

U.S. Ser. No. 13/713,564, incorporated in its entirety by reference herein, discloses connectors providing haptic feedback. As mentioned therein, it is important to provide improved signal security and integrity when communicating between any two EHF communication. One method for enhancing or ensuring proper signal security and integrity is to verify that a second EHF communication unit is within a predetermined range before or during a communication attempt with a first EHF communication unit. To that end, systems and methods for detecting the presence of the second EHF communication unit and/or for ensuring another device or surface is within a certain distance may be included. Examples of such systems and methods are described in US 20120319496.

US 20120319496 (the '496 publication), incorporated in its entirety by reference herein, discloses a system for sensing proximity using EHF signals may include a communication circuit configured to transmit via a transducer an EM signal at an EHF frequency, and a proximity sensing circuit configured to sense a nearby transducer field-modifying object by detecting characteristics of a signal within the communication circuit. Some exemplary proximity-sensing circuits are disclosed therein, and the proximity of a nearby object may be detected by a change in the effective impedance of an antenna caused by the nearby object.

US 20120295539 (the '539 publication), incorporated in its entirety by reference herein, discloses EHF communication with electrical isolation and with dielectric transmission medium. A communication system including two transceivers is disclosed therein. A transceiver operating in a transmit mode may include an amplifier that receives a transmit baseband signal and amplifies the signal for input to a modulator which may apply the baseband signal to an EHF carrier signal produced by an EHF oscillator to produce a transmit electrical EHF signal that is communicated to an antenna for transmission. When the transceiver is functioning in a receive mode, an EHF signal received by an antenna and converted to an electrical signal for input to a demodulator for producing a baseband signal. The communication system disclosed uses a modulated EHF carrier to couple signals across an air or dielectric medium. A very high data rate may be realized using this technique.

Transferring Data Between Electronic Devices

Figure 1A:
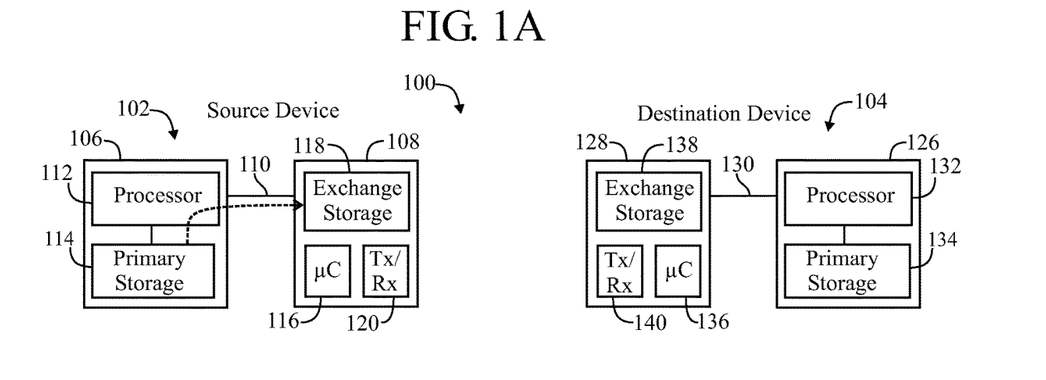
FIGS. 1A, 1B, 1C are diagrams illustrating an exemplary data transfer system, and steps of an exemplary data transfer between two electronic devices.
Figure 1B:
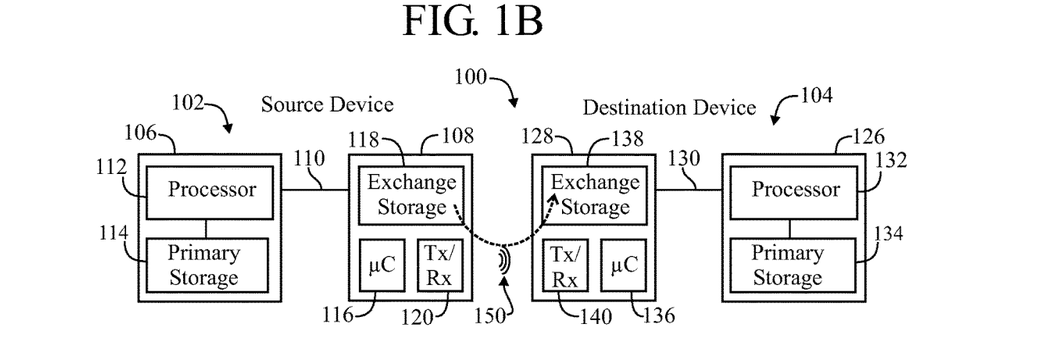
Figure 1C:
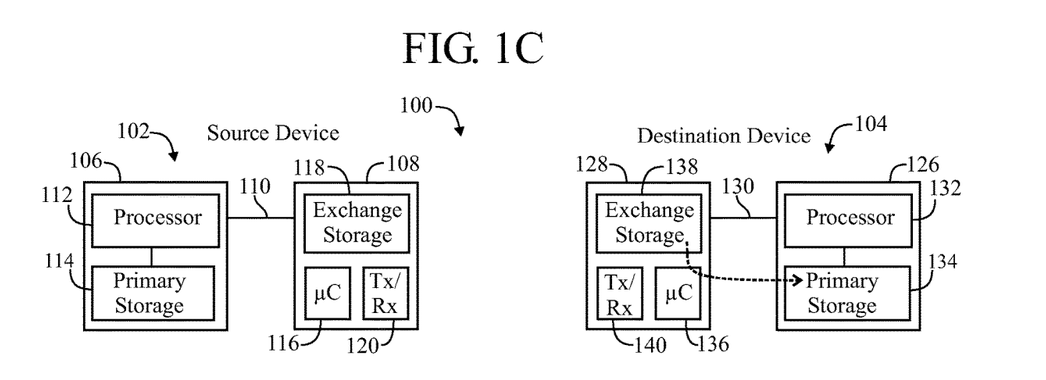

FIGS. 1A, 1B and 1C illustrate of an exemplary data transfer system 100, and some steps which may be implemented to effect a method of transferring data between two (or more) electronic devices ("devices"). Data may be transferred in at least one direction, from a first device 102 which may be regarded as a source for sending the data to be transferred, and second device 104 which may be regarded as a destination for receiving the data which is transferred.

In the main hereinafter, the transfer of data from the first device 102 to the second device 104 will be described. Generally, the first device 102 initiates the data transfer after detecting the second device 104, and the second device 104 may notify the first device 102 that it is ready to receive the data transfer. The second device 104 may also notify the first device 102 of successful receipt of the data being transferred. Data may alternatively or additionally be transferred from the second device 104 (acting as a source for sending the data) to the first device 102 (acting as a destination for receiving the data).

The first device 102 may comprise a host system (or portion) 106 and a communication subsystem (or portion) 108. The host system 106 may communicate with the communication subsystem 108 over a signal line (or bus) 110.

The host system 106 may comprise a processor 112 such as SOC (system on chip), and a "primary" storage 114 such as DRAM or flash memory.

The communication subsystem 108 may comprise a microcontroller (.mu.C) 116, and an "exchange" storage 118 such as DRAM or flash memory. The communication subsystem 108 further comprises at least one of a transmitter (Tx) or a receiver (Rx), or at least one transceiver (Tx/Rx) 120.

The host processor 112 may function as the communication subsystem microcontroller (.mu.C) 116. The primary storage 114 and the exchange storage 118 may be different portions of one storage medium, such as DRAM or flash memory.

The second device 104 may comprise a host system (or portion) 126 and a communication subsystem (or portion) 128. The host system 126 may communicate with the communication subsystem 128 over a signal line (or bus) 130.

The host system 126 may comprise a processor 132 such as SOC (system on chip), and a "primary" storage 134 such as DRAM or flash memory.

The communication subsystem 128 may comprise a microcontroller (.mu.C) 136, and an "exchange" storage 138 such as DRAM or flash memory. The communication subsystem 128 further comprises at least one of a transmitter (Tx) or a receiver (Rx), or at least one transceiver (Tx/Rx) 140.

The host processor 132 may function as the communication subsystem microcontroller (.mu.C) 136. The primary storage 134 and the exchange storage 138 may be different portions of one storage medium, such as DRAM or flash memory.

The transceivers 120 and 140 are examples of means for communicating EHF signals contactlessly between the first device 102 and the second device 104, respectively and for converting between EHF signals and digital electrical signals. The transceivers 120, 140 may each be a half-duplex transceiver which can asynchronously convert a baseband signal into a modulated EHF (extremely high frequency) carrier at 30-300 GHz, or higher, such as 60 GHz carrier frequency, which is radiated from an internal or external antenna (not shown), or can receive and demodulate the carrier and reproduce the original baseband signal.

RF energy output by communication subsystems 108 and 128 may be below FCC requirements for certification or for transmitting an identification (ID) code which would otherwise interrupt data flow during the data transfer. Reference is made to 47 CFR .sctn.15.255 (Operation within the band 57-64 GHz), incorporated by reference herein.

The transceivers 120 and 140 may be implemented as IC chips comprising a transmitter (Tx), a receiver (Rx) and related components. The transceiver chip(s) may be packaged in a conventional manner, such as in BGA (ball grid array) format. The antenna may be integrated into the package, or may be external to the package, or may be incorporated onto the chip itself (such as in the manner of U.S. Pat. No. 6,373,447).

Antennas associated with the transceivers are omitted, for illustrative clarity (they are discussed in detail in the '829 and '244 publications). An exemplary communication subsystem 108, 128 may comprise one, two, or more transceiver chips.

It should be understood that if only one-way communication is required, such as from the source device 102 to the destination device 104, the transceiver 120 could be replaced by a transmitter (Tx) and the transceiver 140 could be replace by a receiver (Rx).

Transmit power and receive sensitivity for the transceivers 120 and 140 may be controlled to minimize EMI (electromagnetic interference) effects and simplify FCC certification. The EHF carrier may penetrate a wide variety of commonly-used non-conductive materials (glass, plastic, etc.). Some features or characteristics of the transceivers 120, 140 may include:

Low latency signal path
  Multi-Gigabit data rates
  Link detection and link training The signals transmitted by the transceivers 120 and 140 may be modulated in any suitable manner to convey the data being transferred from one device to the other device, some non-limiting examples of which are presented herein. Modulation may be OOK (on/off keying) or other similar simple modulation techniques. Signals may be encoded and packetized and transmitted by one transceiver (such as 120), and received and unpacketized and decoded by another transceiver (such as 140). Out-of-band (OOB) signaling or other suitable techniques may be used to convey information other than or related to the data being transferred between the two devices.

FIG. 1A illustrates that, in preparation for a data transfer session, the first (sending, source) device 102 may pre-load data stored in its primary storage 114 into the exchange storage 118 of its communication subsystem 108. This is illustrated by the dashed-line arrow extending from the primary storage 114 to the exchange storage 118, and may occur in advance of any communication session so that the data is ready to be transferred "at a moment's notice". Alternatively, moving data from the primary storage 114 to the exchange storage 118 may occur after a partner device (104) is detected and a data transfer session is about to begin. The exchange storage 118 may be a partitioned part of the primary storage 114.

FIG. 1B illustrates the first device 102 (which is nominally the source/sending partner or device) device 102 having been brought into in proximity with the second device 104 (which is nominally the destination/receiving partner or device). The proximity of the second device 104 with the first device 102 may be detected, by any suitable means, some of which have been described hereinabove, others of which are described hereinbelow. Then, the data may be transferred from the first device 102 to the second device 104. More particularly, data stored in the exchange storage 118 of the communication subsystem 108 of the source device 102 may be transferred to the exchange storage 138 of the communication subsystem 128 of the destination device 104, as indicated by the dashed-line arrow extending between the exchange storages 118 and 138. In the main, hereinafter, data flow from the device 102 to the device 104 may be described, as representative of data flow in either direction (i.e., including data flow from the device 104 to the device 102).

Data transfer between the two electronic devices 102, 104 may be implemented over a "contactless" radio frequency (RF) electromagnetic (EM) communications link (interface) 150, which is handled substantially entirely by the communication subsystems 108, 128 of the first and second devices 102, 104, respectively. Signals flowing between the devices 102 and 104 occurs electromagnetically over a non-electrical (dielectric) medium such as an air gap, waveguide, plastics (polyethylene, thermoplastic polymers, polyvinylidene difluoride, fluoropolymers, ABS, and other plastics), including combinations of these materials. The EHF signal can pass through other dielectric materials such as cardboard. The EHF signal can pass through a series of different dielectric materials and/or waveguides.

Due to the high data rate enabled by the EHF contactless communication, large data files, such as movies, audio, device images, operating systems, and the like may be transferred in very short periods of time in contrast with existing technologies such as NFC. As an example, a 1 Gigabyte data file may be transferred in as little as 5 seconds.

The electromagnetic communication may typically be over an air gap may be limited to a short range, such as 0-5 cm. A dielectric medium such as a dielectric coupler 370, described in greater detail hereinbelow, may be used to extend the range of the contactless link between the devices 102 and 104 to several centimeters (cm), meters, or more.

It should be understood that in this, and any other embodiments of contactless links discussed herein, an overall communications system may be implemented as a combination of contactless and physical links. Furthermore, some of the techniques described herein may be applied to transferring data over a physical link, such as a cable and connectors. In the main, hereinafter, the use of a contactless link for transferring data between the two devices will be described.

FIG. 1C illustrates that, after completion of the data transfer session, the second (receiving, destination) device 104 no longer needs to be in proximity with the first (sending, source) device 102, and may move the transferred data stored in its exchange storage 138 of its communication subsystem 128 into its primary storage 134. This is illustrated by the dashed-line arrow extending from the exchange storage 138 to the primary storage 134, and may occur at any time after completion of the data transfer. The receiving device 104 may verify the data which has been received, may alert its host processor 132 that the data has been received (alternatively the host processor 132 may perform the verification), and may send a signal back to the sending device 102 that the data has successfully been transferred. The exchange storage 138 may be a partitioned part of the primary storage 134.

In an exemplary use scenario, data to be transferred from a sending device 102 may be stored in the primary storage 114 of the sending device 102, and the host system 106 (or processor 112) of the sending device 102 may be OFF (powered down or in a low power state). The communication subsystem 108 of the sending device 102 may be ON, and when a receiving device 104 is detected, the host system 106 (or processor 112) of the sending device 102 may be turned ON to move the data to be transferred from the primary storage 114 to the exchange storage 118 of the sending device 102. This movement of data to be transferred from the primary storage 114 to the exchange storage 118 may only need to be done once, then updated as may be required, such as incrementally. Or, it can be done every time data is being transferred from the sending device 102 to the receiving device 104. In some cases, different data packages may be transferred by the sending device 102 to a given one of or various different receiving device(s) 104, in which case only the selected data package need be moved to the exchange storage 118 for the data transfer. In some cases, the data may not be moved from the primary storage 114 to the exchange storage 118 on the sending device 102 and the data may be transferred directly to the receiving device 104 from the primary storage 114. In some cases, the sending or receiving devices 102 and 104 may not have any exchange storages 118 and 138, respectively, all storage being performed by the primary storages 114 and 134, respectively.

In cases where data will be transferred in one direction only, from the sending device 102 to the receiving device 104, the exchange storage 118 may be eliminated. It may be beneficial, however, that the sending device 102 architecture minor that of the receiving device 104, and include the exchange storage 118, for cases where the sending device 102 receives data from the receiving device 104.

When the communication subsystem 108 of the sending device detects a receiving device 104, a link may be established between the sending device 102 and the receiving device 104 and the transfer of data from the sending device 102 to the receiving device 104 may be initiated. The host system 126 (or processor 132) of the receiving device may be OFF (powered down or in a low power state), and the communication subsystem 128 of the receiving device 104 may be ON or in a low-power state and circuitry for detecting a connection may be periodically enabled. The data which is received by the communication subsystem 128 of the receiving device may be stored in the exchange storage 138 of the receiving device 104. The communication subsystem 128 may verify the data, and may alert the host system 126 (or processor 132) that the data has been received, and the host system 126 (or processor 132) may verify the transferred data. The communication subsystem 128 of the receiving device 104 may also alert the sending device 102, via its communication subsystem 108, that the data has successfully been received.

Data in the exchange storages 108 and 138 of the sending and receiving devices 102 and 104, respectively, may be firewalled, to protect the host systems 106 and 126 from malicious code in the data being transferred. When the receiving device 104 is turned ON, data from its "exchange" storage 138 may be moved (or copied) to its primary storage 134. Data may be also transferred in a similar manner from the receiving device 104 to the sending device 102.

Link Discovery

The process of the first device 102 (notably its communication subsystem 108) detecting the second device 104 (notably its communication subsystems 128) and establishing the contactless link 150 may be referred to generally as "link discovery".

In point-to-point wireless (contactless) systems, it is necessary to determine when to initiate a link between two devices. In traditional connector-based systems, the link establishment can be determined based on measuring some electrical characteristics that change when a connector is plugged in and a link between two devices may be established. In a point-to-point contactless system, an electrical detection method may not be possible.

The transceivers 120, 140 may be enabled to detect a link partner while dissipating minimal power. Link discovery may be implemented by the sending device 102 (more particularly, the transmitter Tx portion of the transceiver 120) transmitting a beacon signal, periodically, for a short duration of time, instead of being enabled continuously. Likewise, the receiving device 104 (more particularly, the receiver Rx portion of the transceiver 140) may be enabled to listen for the beacon, periodically, for a short duration of time, instead of being enabled continuously. A ratio of the transmit and receive durations of time can be established to ensure periodic overlap—i.e., that the receiver will be activated to detect the beacon within a reasonable number of periods. If a transmitter beacon is within an appropriate range to establish a link, the transmitter's beacon will be picked up by an active receiver. This periodic beaconing and listening approach allows for conservation of power (and extended battery life).

Some techniques for link detection, including beaconing and enumeration, and switching from reduced-power to full-power operation, are disclosed in the aforementioned U.S. 61/799,510 filed 15 Mar. 2013, incorporated by reference herein.

Electrostatic Shielding

Because they are communicating with one another strictly by RF, contactlessly, a given device 102 or 104 (or both) may (each) be enclosed in a non-conducting barrier (housing, enclosure, or the like, not shown), such as of plastic or acrylic. Electromagnetic (EM) radiation may pass easily through the barrier, but electrical current cannot pass easily through the barrier. The barrier can therefore isolate circuit board and fragile chips from ESD (electrostatic discharge). The barrier may also hermetically seal the device(s). The barrier may additionally provide a benefit to device(s) such as cell phones, for example protecting them from moisture and humidity. The electromagnetic interface (EM) techniques disclosed herein may completely eliminate the need for any mechanical connectors (other than, perhaps a jack for recharging an internal battery) or other openings in the device.

Method(s) of Operation

The technique(s) presented herein solve(s) the problem of transmitting data between two (or more) electronic devices—one of which may be considered to be a sending device, the other of which may be considered to be a receiving device—without intervention by one or both of the devices' host processor(s) by providing one or both of the electronic devices with a communication (I/O) subsystem that can detect and set up a communication link (such as a contactless link) with the other device, control the transfer of data from the sending device to the receiving device without intervention from the host processor(s) in one or both of the devices, and that can maintain or direct the data to be transferred or being received in a secure area of the device's memory or a physically separate memory ("exchange storage") which may be isolated (such as firewalled) from the device's main memory ("primary storage"). This provides protection against malicious code in the data being transferred, and also allows a device to participate in the communication session without its main processor being turned ON.

The communication subsystem of the receiving device then may validate the data transfer (transaction) itself or notify the host processor in the receiving that the data has been transferred into the exchange storage. In the latter case, the host processor of the receiving device then may validate the transaction and transfer the data from the exchange storage to the primary storage.

In one example of data which is transferred, the primary storage may comprise a user area of memory, and the user may then have access to the data which has been transferred, for example a media file (such as pictures, video, music, etc.).

In another example, the data being transferred may be an operating system (OS) update or code update to the operating system of the receiving device, or other critical code. Once the data has been transferred into the exchange storage, the data may then be validated by the communication subsystem itself or other secure portion of the receiving device. Once validated, the transferred data may be moved securely from the exchange storage to the device's primary storage, to replace or update the OS or other critical code in the system. In this manner, the data being transferred may be able to update the system while the host processor is OFF (powered down) or in a low power state.

Figure 2:
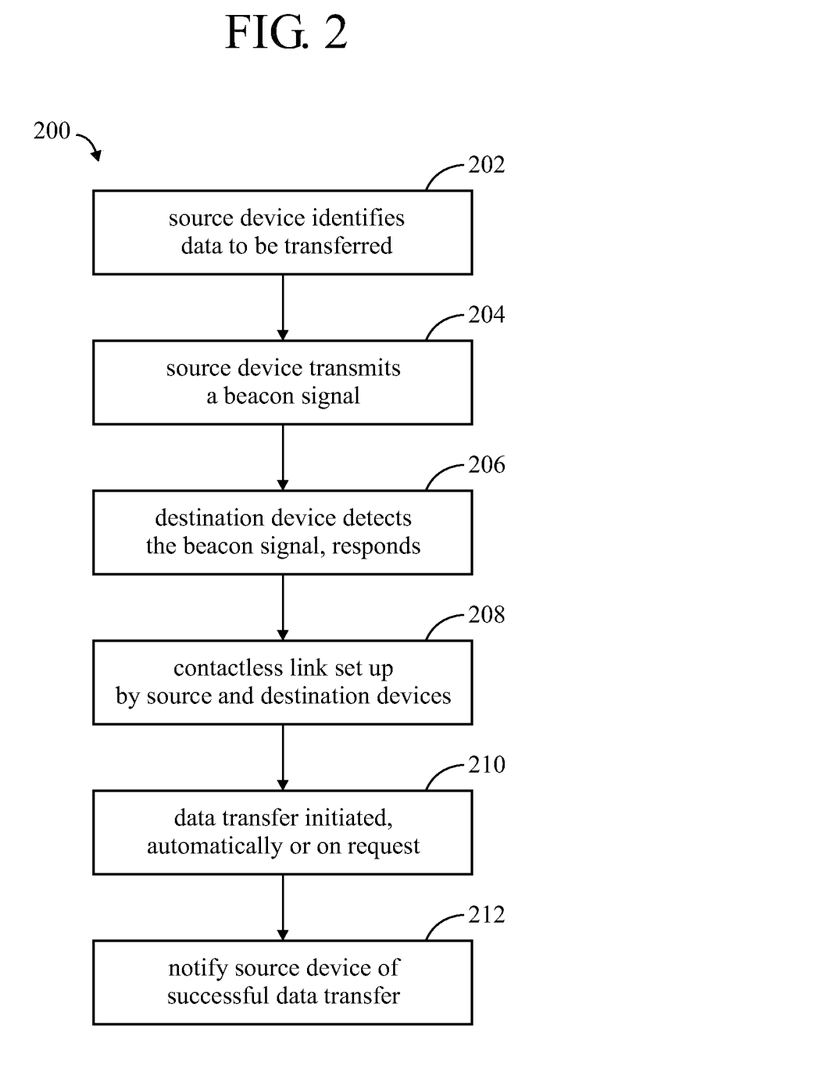
FIG. 2 is a flowchart illustrating some methods of operation for the data transfer system and devices thereof.

FIG. 2 is a flowchart of a generalized exemplary overall method 200 of transferring data between two electronic devices—one of which may be considered to be a sending (source) device, the other of which may be considered to be a receiving (destination) device—presenting some of the concepts discussed and described above. A high-speed contactless link may be established between communication I/O subsystems of the devices which may operate without intervention from the host processors of the devices, and the data may be stored in a secure area of memory ("exchange storage") of the receiving device, and optionally also in an exchange storage of the sending device. The method 200 may be described in a number of steps. In some cases, steps which are described are optional, and can be omitted. In other cases, the order in which the steps are presented may be changed.

In a first step 202, the source device (102) may identify the data to be transferred. Recall that either of two devices which will be involved in a data transfer may be considered to be the source (or sending) device (102) with the other device being considered to be the destination (or receiving) device (104), and that communication may occur in both directions between the devices rather than only in one direction. Hence, for example, although in this step, it is stated that the source device (102) identifies data to be transmitted, at some point during the communication session, including before initiating the communication session, the destination device (104) may also identify data that will be transferred to the source device (102).

In a next step 204, the source device (102) may transmit a beacon signal to enable discovering a destination device (104).

In a next step 206, the destination device (104) detects the beacon signal and may optionally respond thereto, such as by turning on its own beacon.

In a next step 208, the contactless link (150) is set up by the source device (102) and the destination device (104). This setup process occurs very quickly, and the data transfer session is ready to commence. Typically, only one destination device (104) will be involved with a single source device (104), but the possibility of having one source device (102) transmitting (transferring) data to more than one destination device (104), in a "broadcast" mode, using index markers in the data stream, is discussed below.

In a next step 210, data is transferred from the source device (102) to the destination device (104). The data transfer may be initiated either automatically (based on link detection) or upon request (such as the destination device's microcontroller 136 or host processor 132 indicating that it is ready for the data transfer to commence, or to resume a previous data transfer which was interrupted). Optionally, other data may also be transferred from the destination device (104) to the source device (102), automatically or on request.

The source device (102) may start sending data when a destination device is detected and a communication link is established. Or, the source device may send data continuously, in a "broadcast" mode to be received by one or more destination devices (104). In either case (sending on demand or continuously), the source device (102) may embed index markers in a data stream such as at the beginning of the data stream, at a number of intermediate points (such as at pre-determined intervals or other milestones) in the data stream, and at the end of the data stream. In this manner, the destination device (104) can ascertain if it has started receiving data at the beginning of a data stream and, if not, at what part of the data stream it has commenced receiving the data, when the data transfer is complete. In this manner, if the destination device (104) has started receiving a data stream at an intermediate point, it has the option of accepting (commencing receiving and storing) the transfer of only a latter portion of the data stream (partial file transfer), then receiving a beginning portion of the data stream when the source device (102) loops (restarts) the entire transmission, thereafter receiving the missing beginning portion of the data stream. Or, the destination device (104) may accept only the partial file transfer, without further action. This approach allows for fully passive (receive-only) transmission of data, such as may be useful for kiosking data to anonymous devices.

Another technique which may be implemented during the transmission (transfer) of data from the source device (102) to the destination device (104), which may involve transmission in the reverse direction (as suggested above) may include the source device (102) pausing (skipping) transmission of a data stream at periodic intervals, and allowing the destination device (104) to transmit "skip fills" (data) back to the source device during the skipped periods. The "skip fills" by the destination device (104) may be an on-the-fly encryption code generated and transmitted by the destination device (104) that the source device (102) receives and uses to scramble the data being transferred (transmitted), or can allow for masking the transmission with random (or watermarked) data transmitted by the destination device (104). In the case of "snooping" (unauthorized devices intercepting the data transfer), these methods may render the snooped transmissions very difficult to crack (decode), as the snooping device would not readily be able to ascertain which of the source or destination devices is transmitting at any given moment—the intercepted alternating transmissions by both source and destination devices may appear to the snooping device to be one contiguous, undecipherable transmission.

Further security (against snooping) for full-duplex transmission (transfer) of data between devices (102, 104) may be provided by causing both devices to transmit concurrently during a data transfer. The device which is nominally the receiving device can transmit random signals, decryption codes, or other data, which may obscure the transmission of data from the device which is nominally the sending device. One or both transmitting device(s) may implement spread spectrum clocking (SSC) which may further hinder snooping.

In a next step 212, the destination device (104) may notify the source device (102) that the data transfer has been successfully received. If the "success" notification is not received by the source device (102), or if a "fail" notification is sent by the destination device (104), the source device (102) may re-send the data, or portions thereof. Optionally, upon completion of the data transfer, the host processor (132) of the destination device may also be notified.

The data which is received may first be stored in exchange storage (138) of the receiving device (104), and may subsequently be moved to the primary storage (134) of the destination device (104). Or, the data which is received may be remain in the exchange storage (138) without being moved to the primary storage (134). The data which is received may be validated, either by the communication subsystem (128) or by the host system (126). Or, the data which is received may be used "as is", without validation.

The transmitters (Tx) and receivers (Rx), or transceivers (Tx/Rx) 120 and 140, which may be implemented as chips, may be factory-serialized, so that the chips and their transmissions may be 'tagged' (fingerprinted), which may enable a later forensic analysis to be performed for digital rights management (DRM). For example, protected (premium) content could be freely (unimpeded) transferred from one device to another, but the transaction could be traced to the specific devices involved, so that the participants in the transaction can be held accountable (such as, billed).

Some Exemplary Deployments

Some exemplary use scenarios (deployments) for the data techniques disclosed herein will now be described, generally in the context of only two electronic devices—one of which may be considered to be a sending (source) device, the other of which may be considered to be a receiving (destination) device, generally as described above. A single source device (102) may transmit (transfer) data to a plurality of destination devices (104), either one at a time or many at once. And, in addition to the source device transmitting data to the destination device(s), the destination device(s) can transmit data to the source device.

In the deployments described herein, or in other deployments which are not specifically described herein, one or more of the following features, and the like, and extensions thereof may be realized:

- the data transfer ("contactless programming") may occur at high speed. The host processor(s) in the destination device(s) being programmed may be OFF, or in a low power mode ("asleep")
- the data which is transferred may be validated by connection
- the data which is transferred may be stored in secure (exchange) memory
- destination device(s) can be tested and their status(es) read
- OEM specific code may be loaded into the destination device(s)
- applications and content may be loaded into the destination device(s)
- the source device(s) may or may not already be in packaging (such as sealed boxes)
- there could be different versions of software/OS for different customers or different vendors In an exemplary scenario ("Factory Programming"), a first device (102), such as a mobile handset, which is considered to be the receiving (destination) device for the data being transferred, is programmed at the factory, by a second device such as a factory programming device ("programmer"), which is considered to be the sending (source) device. By utilizing a contactless link, as described above, no physical connections are required between the device to be programmed and the device ("factory programmer") transferring the data, such as by placing the device to be programmed on a landing pad (or dock) associated with the factory programmer. This can greatly simplify the data transfer process, and increase throughput.

For example, the data being transferred from the sending device to the receiving device may comprise an operating system (OS) or firmware for the receiving device. Alternatively, or additionally, during factory programming, the second device may be tested, and its status read by the programmer, providing a level of quality assurance (QA) at the manufacturing stage.

In another exemplary scenario ("Warehouse Programming"), features similar to Factory Programming may be implemented. For example, a warehouse having a large inventory of mobile phones may accept orders from customers and personalize the products for the ordering party (such as a given cell phone provider), via contactless communication and data transfer, without opening the box in which the product is packaged. This could apply, as well to online vendors (or the like) who can accept orders from individual end-users, and pre-load the product with personalized items (operating system, software applications, and the like), again contactlessly, without requiring opening the box. Quality assurance (QA), and some of the other features described above may be implanted during Warehouse Programming.

The Factory Programming and Warehouse Programming scenarios are exemplary of situations where "generic" devices are in a box that should remain unopened, yet may be personalized for a given vendor or service provider, or with end-user preferences, including loading features on the device, customizing the devices' content, loading premium items on the device, setting permissions on the device, installing DRM keys on the device, setting country codes in the device, and the like, some of which personalization features may additionally or alternatively be performed at a point of sale (POS) vendor. Using the techniques disclosed herein, the data transfer can occur very quickly, and the host processor may be OFF (or in a low power state), both of which will result in very low power required for the transfer and consequent small amount of drain of the device's batteries (if any). (In some deployments, power for the destination device may be obtained by harvesting power from an external source.)

In another exemplary scenario ("Point of Sale Programming"), features similar to Warehouse Programming may be implemented. More specifically, retailer or OEM specific content or applications (personalized content, purchased along with the device) could be loaded into the device. (While the device may be unboxed at the point of sale, the contactless programming may nevertheless be highly beneficial.) The device being sold to a customer can personalized for the given customer and can be given a final (QA) check to activate the warranty. Typically, but not necessarily, in Point of Sale (POS) programming, the item is unboxed. Contactless data transfer eliminates the need to un-box the item.

In another exemplary scenario ("Kiosking"), devices which are already sold an in possession of an end user may receive data transfers from kiosks functioning as source devices for the data transfer. For example, content vending machines may transfer data selected by users to the users' devices (typically for a fee). Free content may also be distributed in this manner, such as "bonus" content associated with an event attended by the user, such as at movie theatres, by incorporating a source device into a movie poster or the like. Unlike QR (Quick Response) code applications which may require an Internet connection to obtain the actual content, Code), the contactless transfer of data described herein is complete in and of itself. The content is contained in the interaction between the two devices.

In another exemplary scenario ("user-machine interface"), access and permissions may be communicated between a use and a system. For example, a "generic" (shared) computer may be personalized (configured) for use by a user. A vehicle being shared by various users may be personalized (seat position, speed limits, etc.) by a user.

In the scenarios discussed above—Factory Programming, Warehouse Programming, Point of Sale Programming, Kiosking—it is generally the end product (such as a user's mobile handset) that is being modified (personalized) by the contactless communication (transfer of data). In contrast therewith, in the user-machine interface scenario, it is the system (shared computer, shared car, etc.) that is being modified by the contactless communication (transfer of data). Using contactless communication for digital checkout of an item (such as from a library, or from a rental agency) may broadly be considered to fall into this category of user modifying system.

In another exemplary scenario ("Sharing Data Between Two Devices"), data may be downloaded from one device to another, such as from a user's digital camera to the user's laptop computer, or from one user's mobile handset to another user's mobile handset. In this "file sharing" scenario, both devices may typically become "modified" as a result of the contactless transaction, in an interactive session between the users of two (or more) devices. In contrast with existing techniques for sharing data between two devices (such as NFC), using the techniques disclosed herein content which is large files (such as movies) may readily be directly transferred between two devices in a very short period of time.

Sometimes the content (data) being transferred may be DRM protected data, and a key may be required to access the content. As mentioned above, content may be stored in a secure (exchange storage) area, may be checked for malicious code, and may accessed from the exchange storage then discarded, or moved to permanent (primary) storage for later (and repeated) access thereto. These are just some examples of how data can be transferred, at various stages in the life of a product (from manufacturer to consumer), and some of the use scenarios that may be implemented using the techniques described herein.

Dielectric Couplers

In the scenarios described above, it is more-or-less presumed that the communication subsystems of the two devices (and their respective antennae, if any) can be brought into close proximity with one another to initiate and sustain the contactless link for transferring data, which may be the case in many, if not most contemplated use scenarios. This may include Factory Programming, Warehouse Programming, or the like, where the product being programmed is "factory sealed" within a (typically cardboard) box. In some other scenarios, close proximity of the communications subsystems (and their respective antennae) may not be feasible. Some of these scenarios will now be described.

Figure 3A:
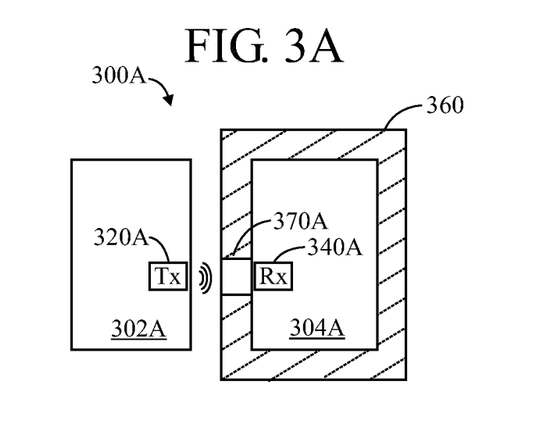
FIGS. 3A, 3B and 3C are diagrams of some use scenarios (deployments) for devices using the data transfer techniques disclosed herein.
Figure 3B:
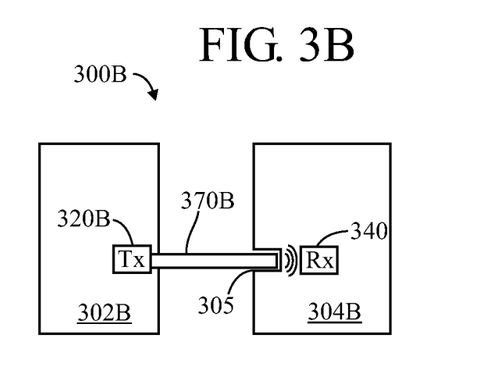
Figure 3C:
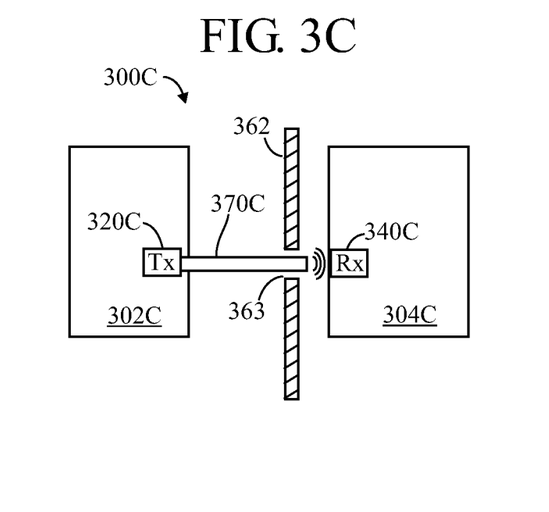

To simplify the descriptions of these scenarios (300A, 300B, 300C, collectively referred to as "300"), communication in one direction only may be described, with a first device (302A, 302B, 302C, collectively referred to as "302") having only a transmitter (Tx; 320A, 320B, 320C, collectively referred to as "320"), and a second device (304A, 304B, 304C, collectively referred to as "304") having only a receiver (Rx; 340A, 340B, 340C, collectively referred to as "340"). It should be understood that communication between the devices may occur in both directions (some examples of which have been described hereinabove) and that the devices (302, 304) may each be provided with one or more transceivers (Tx/Rx; 120, 140).

FIG. 3A illustrates a scenario 300A wherein a device 304A which may be considered to be a destination (receiving) device is enclosed in packaging such as a cardboard box 360, and its operative components are disposed at what may be an "excessive" distance from the external surface of the box which is not conducive to establishing the aforementioned EHF contactless link (150) with a device 302A which may be considered to be a source (sending device) which is external to the box 360. This may be due to shock absorbing packing material (shown as dashed cross-hatch lines within the box), and the like, surrounding the device 304A.

In this scenario 300A, it may be necessary or beneficial to transfer data from the device 302A to the device 304A, without opening the box 360. This situation has been described above, such as at the factory, or at a warehouse, or at POS. To facilitate establishing the contactless link (150) for transferring data, a dielectric coupler 370A, such as in the form of a short rod, or plug may be incorporated into or extend through the packing material within the box, establishing a link between the device 304B and an interior surface of the box 360, which remains closed and sealed. In this manner, a left (as viewed) side or end of the coupler 370A can be in close proximity with the transmitter (Tx) 320A of the device 302A, and the right (as viewed) side or end of the coupler 370A may be in close proximity with the receiver (Rx) 340A of the device 304A. The coupler 370A provides means for reducing the effective distance between transmitter (Tx) 320A and the receiver (Rx) 340A to facilitate the contactless link between the two devices. Rather than having a separate and distinct dielectric coupler, it is possible that the packing material itself be manufactured from materials and with properties and structure that allow it to act as the dielectric coupler.

FIG. 3B illustrates a scenario 300B wherein the receiver 340B of the device 304B is disposed at an "excessive" distance from the external surface of the device 304B which is not conducive to establishing the aforementioned EHF contactless link (150) with a device 302A.

In this scenario 300B, it may be necessary or beneficial to transfer data from the device 302B to the device 304B, without opening up the device 304B. This situation may occur, for example, when the device (304) is in a protective container, such as an underwater camera.

To facilitate establishing the contactless link (150) for transferring data, a dielectric coupler 370B, such as in the form of an elongated rod ("probe") extends from the device 302B. The device 304B is provided with a recess 305 in one of its outer surfaces to allow the right (as viewed) end of the coupler to be in close proximity with the receiver (Rx) 340B of the device 304B. The left (as viewed) end of the coupler 370B can be in close proximity with the transmitter (Tx) 320B of the device 302B. The coupler 370B provides means for reducing the effective distance between transmitter (Tx) 320B and the receiver (Rx) 340B to facilitate the contactless link between the two devices.

FIG. 3C illustrates another scenario 300C, wherein there is a barrier 362 between the device 302C and 304B, which may for example be a conductive barrier substantially preventing establishing a contactless link (150) between the two devices 302C and 304C, even if they are sufficiently proximate each other to otherwise set up the contactless link.

In this scenario 300C, it may be necessary or beneficial to transfer data from the device 302C to the device 304C, while overcoming the impediment of the barrier 362. The receiver 340C of the device 304C is near its external surface, but access can only be established through a hole 363 in the barrier 362. This situation may occur, for example, when reading utility meters which are enclosed in a protective barrier or otherwise not readily accessible.

To facilitate establishing the contactless link (150) for transferring data, a dielectric coupler 370C, such as in the form of an elongated rod extends from the device 302C, in a manner which may be similar to the scenario 300B. The a left (as viewed) end of the coupler 370C can be in close proximity with the transmitter (Tx) 320C of the device 302C. The right (as viewed) end of the coupler 370C can pass through the hole 363 in the barrier 362 so as to be disposed in close proximity with receiver (Rx) 340C of the device 304C, to facilitate the contactless link between the two devices.

The concept of providing a dielectric coupler to extend the range of the contactless link is described in the aforementioned U.S. 61/661,756 and U.S. Ser. No. 13/760,089. Generally, a dielectric coupler for facilitating propagation of EHF-frequency signals may include an elongate strip of dielectric material (medium) such as plastic, glass, rubber or ceramic, and may have a rectangular cross section and two ends. Suitable plastic materials for the dielectric medium may include, but are not limited to, PE (polyethylene), acrylic. PVC (polyvinylchloride), ABS (Acrylonitrile-Butadiene-Styrene), and the like. The dielectric coupler may include dielectric portions made of plastic or other materials having a dielectric constant of at least about 2.0. Materials having higher dielectric constants may result in reduction of required dimensions due to a reduced wavelength of the signal in that material. The dielectric material of the plastic cable that may be at least partially coated in a layer having a low dielectric constant or an electrically conductive layer to facilitate propagation, reduce interference, or to reduce the likelihood of shorting the signal being propagated down a long axis of the coupler. The dielectric medium may function as a transmission medium (such as waveguide), and the EHF carrier may propagate along a long axis of the dielectric medium, maintaining a single polarization direction. An outer surface of the dielectric medium may be coated or covered with a conductive material (metal) which may isolate the dielectric medium from external interference (and, optionally, and may serve as a conductive path for electrical signals and/or power). Stacked or layered structures may enable multiple signal paths.

Securing the Transmissions

The point-to-point contactless links described herein are inherently secure. Pausing (skipping) transmission of a data stream at periodic intervals, and allowing the destination device to transmit "skip fills" back to the source device during the skipped periods has been described above a "technical" approach to protecting against snooping. In some applications, additional security against snooping may be desirable.

Some examples of means for providing "shielding" of the transmissions (which may be considered to be a "physical" approach) to prevent against snooping will now be described. Generally, a security enclosure, which may comprise dielectric, plastic or other passive materials, may be disposed as a coating or layer, or as a housing around at least a portion of the data paths including the transceivers (Tx/Rx), the contactless link, and dielectric coupler (if any), to protect the data being transferred from being snooped. The contactless link (or transmission path) may include a dielectric coupler. Although the enclosure may be generally transparent to electromagnetic radiation (the EHF signal can get through), signals passing therethrough may become "muddled" by the composition or structure of the enclosure, making any signals received outside the disclosure unintelligible.

Figure 4A:
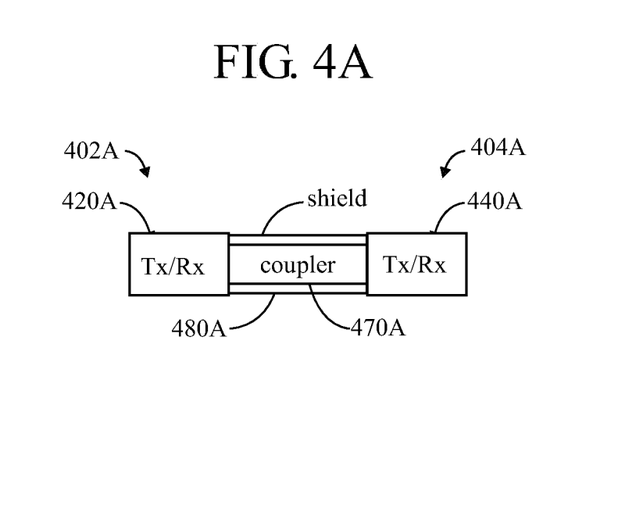
FIGS. 4A, 4B and 4C are diagrams illustrating some techniques for shielding data transfer between two devices.

FIG. 4A illustrates a transceiver (Tx/Rx) 420A of one device 402A communicating over a dielectric coupler 470A with a transceiver (Tx/Rx) 440A of another device 404A. The dielectric coupler 470A may be a plastic material selected for its ability to propagate EHF signals, as discussed above.

In this example, an enclosure 480A comprising a coating (or layer) of material disposed on (covering at least a portion of) the dielectric coupler 470A may be provided. Generally, the material selected for the enclosure 480A may be different from the material selected for the dielectric coupler 470A. The "shielding" material of the enclosure 480A may comprise dielectric, plastic or other passive materials, selected for their properties (or modified) of being able to degrade an EHF signal emanating from the dielectric coupler and passing through the material by any suitable mechanism such as:

changing the polarization of a signal passing through the enclosure 480A superimposing two or more signals within the enclosure together such that an outside observer would observe only the superimposed signal modifying a the coating to have different composition, different thicknesses, various "imperfections", irregular topography or the like, which will degrade the intelligibility of a signal passing through the enclosure a coating of a metallic material may also be used for the housing, or particles of metallic material may be embedded in the housing, but their effect on the desired propagation of the signal from device-to-device should be taken into account.

Figure 4B:
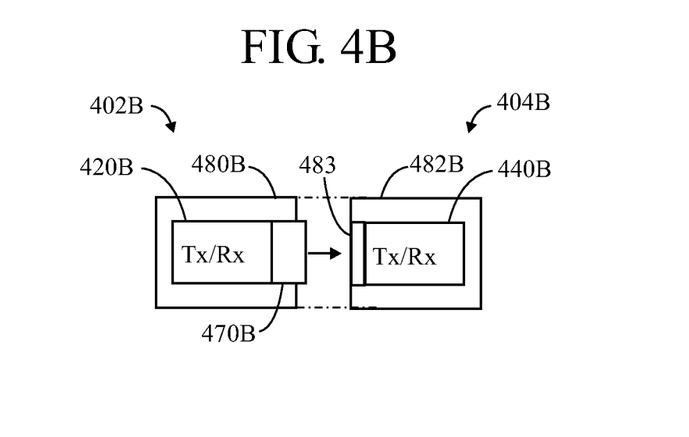

FIG. 4B illustrates a transceiver (Tx/Rx) 420B of one device 402B communicating over a dielectric coupler 470B with a transceiver (Tx/Rx) 440B of another device 404B. (This example is similar to the examples shown in FIGS. 3B and 3C where probes 370B and 370C are associated with the first device 302B and 302C, respectively.) The dielectric coupler 470B may be a plastic material selected for its ability to propagate EHF signals, as discussed above.

In this example, an enclosure 480B comprising a coating (or layer) of material covering at least a portion of the device 402B, such as disposed at least around a portion of the transceiver (Tx/Rx) 420B is shown. Similarly, an enclosure 482B comprising a coating (or layer) of material covering at least a portion of the device 404B, such as disposed at least around a portion of the transceiver (Tx/Rx) 440B is shown. Generally, the material selected for the enclosures 480B ad 482B are, as described above, selected for their properties or modified to degrade any signal emanating from the dielectric coupler through the coating.

As illustrated, a recess (or opening) 483 may be provided in the enclosure 482B for accepting a distal end of the dielectric coupler 470B so that it may be in close proximity with the transceiver (Tx/Rx) 440B. (Compare recess 305 and hole 363 in FIGS. 3B and 3C, respectively.) The distal end of the dielectric coupler 470B and the recess 483 may be keyed, or the like, to enforce inserting the dielectric coupler 470 in a certain orientation into the recess and/or to provide a releasable snap-fit or the like between the two devices 402B and 404B.

Figure 4C:
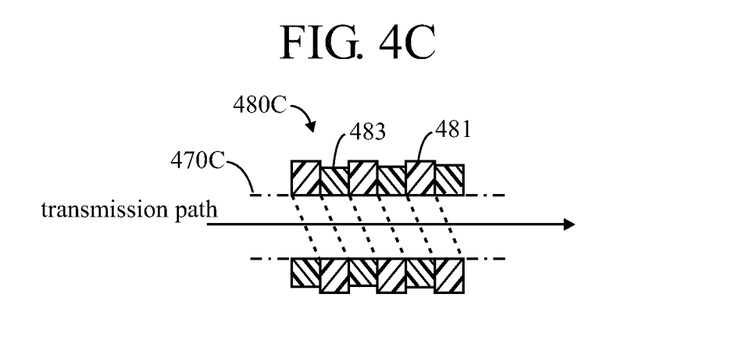

FIG. 4C illustrates in a general manner some options for shielding a transmission path 470C such as an air gap or dielectric coupler. Generally, a housing (or layer, or coating) 480C may be disposed around at least a portion of, including substantially all of, the transmission path, to degrade any signal passing therethrough. The housing 480C is illustrated as comprising at least two different materials 481 and 483, having different sections with different thicknesses, an irregular topography on at least one of the inner or outer surfaces thereof, may comprise spiral wound bands of material (as indicated by the diagonal dashed lines), and the like, including any material or structural property which may degrade an EHF signal passing therethrough.

Generally, inside the enclosure(s) described herein, the EHF signals generated by and passing between the transceivers (Tx/Rx) may be distinct, polarized, and distinguishable from one another. Outside the enclosure(s), the signals may be blended together, shifted in phase, altered in polarization, or the like, so that although a (snooping) device outside the enclosure may detect that there is a signal, the signal would be so degraded or blended together that it would be indecipherable. This "physical" approach to protecting against snooping, in addition with "technical" approaches such as skip fills (described above), spread spectrum clocking (SSC), encryption/decryption and the like, may provide enhanced security for data being transferred between two devices.

Some Advantages

Some advantages and benefits of the techniques disclosed herein may include, but are not limited to one or more of the following, including various combinations thereof:

data transfers may be extremely fast and may not require host interface for the data transfer the host processor may be OFF or in a low power state during transfers data may be transferred from unknown (un-trusted, such as lacking a security certificate) sources in a secure manner into a host device without the host device security or OS being compromised (the data may later be validated)

data to be transferred, or which has been transferred, may be kept in a secure area of memory, away from critical code OS/device updates may be performed while the host processor is OFF or in a low power state OS/device updates may be performed on an assembly line contactlessly OS/device updates may be performed while the device is inside its packaging OS/device updates may be performed at any stage in the supply chain from factory to consumer, such as at the factory, at a warehouse, at a store, at the time of purchase, when the product is delivered, when the customer wants to update the product, at a kiosk, etc.

user code/custom configuration may be loaded at the time of purchase or product delivery data transfer can be effected through dielectrics, cardboard, packaging, etc.

providing "technical" and "physical" protection(s) against snooping of data being transferred The transfer of data between devices is very user-friendly, requiring little or no user interaction or direction to perform. Generally, proximity of the two devices may be all that is required to initiate and perform the data transfer.

While the invention(s) has been described with respect to a limited number of embodiments, these should not be construed as limitations on the scope of the invention(s), but rather as examples of some of the embodiments. Those skilled in the art may envision other possible variations, modifications, and implementations that should also be considered to be within the scope of the invention(s), based on the disclosure(s) set forth herein, and as may be claimed.

What is claimed is:

1. A method of data transfer comprising:
transferring data contactlessly over an extremely high frequency (EHF) contactless link between a first device and a second device, wherein the EHF contactless link enables EHF signals to be contactlessly transmitted over an anisotropic physical path through a dielectric medium, wherein the anisotropic physical path through the dielectric medium is characterized by a point-to-point contactless communications scheme that has an effective range on the order of one centimeter when the dielectric medium is air, comprising:
point of sale programming the second device comprising:

transferring data comprising an operating system or firmware to the second device;

performing a quality assurance check on the second device with respect to the operating system or firmware transferred thereto; and personalizing the second device for a customer associated with the second device.

2. The method of claim 1, further comprising executing the point of sale programming of the second device while the second device is boxed within OEM packaging.

3. The method of claim 1, wherein performing the quality assurance check on the second device comprises activating a warranty for the second device.

4. The method of claim 1, wherein the point of sale programming further comprises personalizing the second device at a point of sale (POS).

5. The method of claim 1, wherein personalizing the second device for a customer associated with the second device comprises loading purchased content on to the second device.

6. The method of claim 1, wherein personalizing the second device for a customer associated with the second device comprises loading at least one application on to the second device.

7. The method of claim 1, wherein transferring data contactlessly over the EHF contactless link further comprises:

at the first device, identifying data to be transferred;

at the first device, transmitting a beacon to discover the second device;

at the second device, detecting and responding to the beacon;

setting up and commencing transfer of the identified data; and initiating the data transfer automatically or on request.

8. A method of transferring data contactlessly over an extremely high frequency (EHF) contactless link between a first device and a second device, comprising:

communicating permissions and preferences via the EHF contactless link between a user device and a shared system, wherein the EHF contactless link enables EHF signals to be contactlessly transmitted over an anisotropic physical path through a dielectric medium, wherein the anisotropic physical path through the dielectric medium is characterized by a point-to-point contactless communications scheme that has an effective range on the order of one centimeter when the dielectric medium is air; and sharing data via the contactless link between the user device and the shared system based on the communicated permissions and preferences such that the sharing of data modifies the shared system.

9. The method of claim 8, wherein the shared system is a car.

10. The method of claim 8, wherein the shared system is a digital checkout facility.

11. The method of claim 8, wherein the digital checkout facility is a library or a rental agency.

12. The method of claim 8, further comprising:

detecting a beacon sent by the user device; and establishing the EHF contactless link between the shared system and the user device in response to detecting the beacon.

* * * * *